United States Patent [19]

Takigawa et al.

[11] 4,271,885
[45] Jun. 9, 1981

[54] HEAVY DUTY PNEUMATIC RADIAL TIRE EXHIBITING LESS RAILWAY WEAR

[75] Inventors: Hiroyoshi Takigawa, Kodaira; Mitsuhisa Yahagi, Sayama; Hiroshi Ogawa, Kodaira, all of Japan

[73] Assignee: Bridgestone Tire Co., Ltd., Tokyo, Japan

[21] Appl. No.: 896,425

[22] Filed: Apr. 14, 1978

[30] Foreign Application Priority Data

Apr. 26, 1977 [JP] Japan .............................. 52-90077[U]

[51] Int. Cl.³ ............................................. B60C 11/00
[52] U.S. Cl. ............................ 152/209 R; 152/209 D; 152/361 R
[58] Field of Search ....... 192/209 R, 209 D, 209 NT, 192/209 WT, 324, 325, 330 R, 352 R, 354 R, 361 R; D12/142, 143, 145

[56] References Cited

U.S. PATENT DOCUMENTS

| | | | |
|---|---|---|---|
| 2,756,797 | 7/1956 | Campbell | 152/209 R |
| 3,831,654 | 8/1974 | Boileau | 152/209 R |
| 3,841,374 | 10/1974 | Boileau | 152/209 R |
| 4,078,596 | 3/1978 | Nakayama et al. | 152/209 R |
| 4,122,879 | 10/1978 | Takigawa et al. | 152/209 R |

*Primary Examiner*—John T. Goolkasian
*Assistant Examiner*—Thomas Bokan
*Attorney, Agent, or Firm*—Sughrue, Rothwell, Mion, Zinn and Macpeak

[57] ABSTRACT

A heavy duty pneumatic radial tire exhibiting less railway wear is disclosed. This tire has a tread pattern formed in a tread divided into a plurality of circumferential ribs by at least two zigzag grooves. Each of these zigzag grooves has a width, amplitude and pitch of 4.5 to 7.5%, 0.5 to 2.0% and 2.0 to 7.0%, respectively, based on a width of the tread.

2 Claims, 8 Drawing Figures

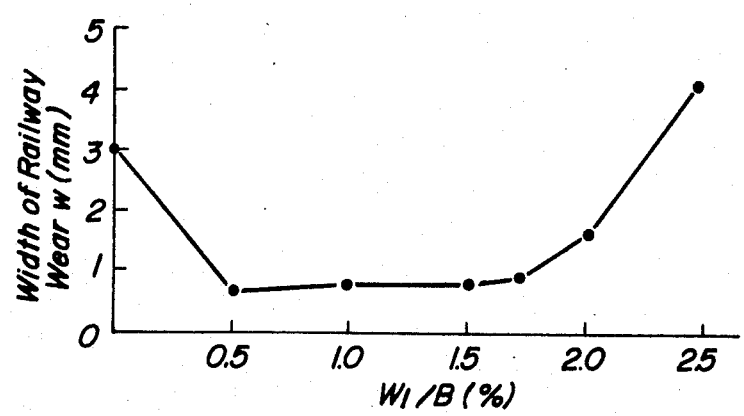
FIG_3
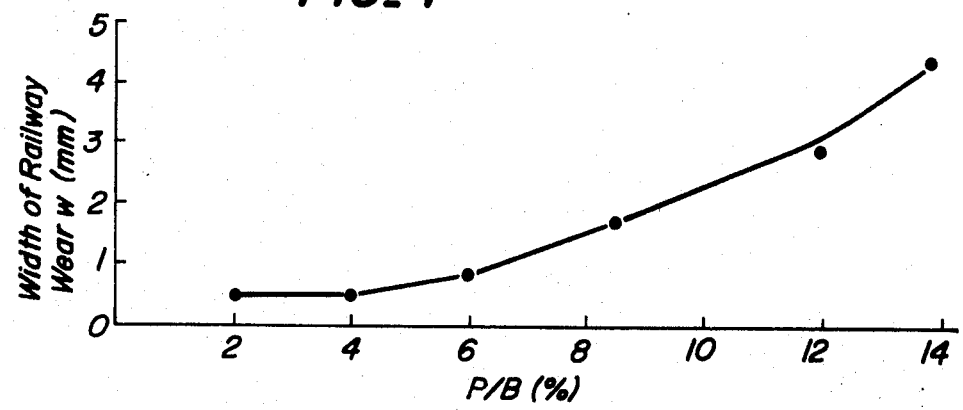
FIG_4
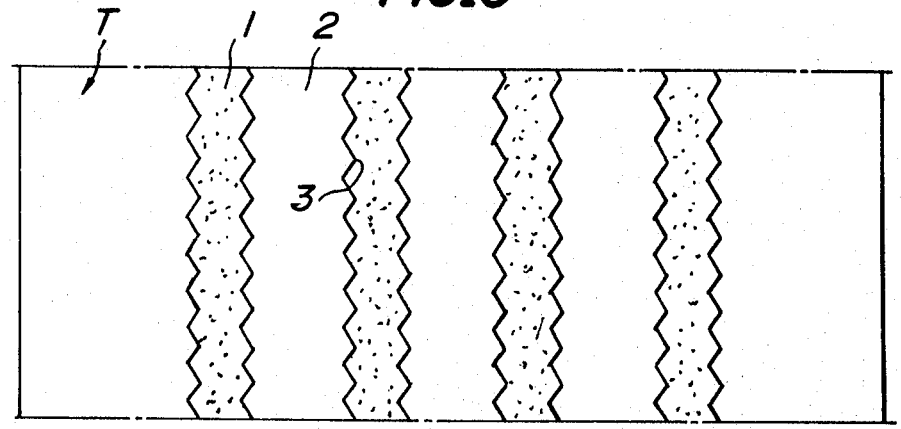
FIG_5

HEAVY DUTY PNEUMATIC RADIAL TIRE EXHIBITING LESS RAILWAY WEAR

BACKGROUND OF THE INVENTION

1. Field of the Invention

This invention relates to heavy duty pneumatic radial tires exhibiting less railway wear, and is to diminish extraordinarily irregular wear, particularly railway wear, which are apt to occur in such tires when continuously travelling at a high speed over a long distance, by an improvement of a tread in the tire.

2. Description of the Prior Art

In general, radial tires provided with at least two metal cord layers as a belt reinforcement have excellent resistance to wear, puncture and the like as compared with conventional bias tires because a highly stiff belt layer is arranged between the tread rubber and the carcass ply. On the other hand, radial tires are somewhat defective in the comfort degree owing to the rigid reinforcing effect with such belt. Accordingly, these radial tires have usually been developed for use on good roads as distinguished from unimproved ones. Recently, the demand for such tires has considerably increased in association with the remarkable improvement of road circumstances such as the development of networks of highways and the like.

In such applications, zigzag-type ribs extending circumferentially of tire are usually provided in the tread of tire. Generally, tires having such a tread pattern are called as a rib-type tire.

In the rib-type tire, ribs are usually continuous toward the circumferential direction of tire and may be discontinuous toward the circumferential direction due to the presence of traverse grooves arranged along the widthwise direction of tire. In any case, when a vehicle provided with such tires goes continuously straight on a highway at a high speed over a long distance, there are caused extraordinarily irregular wear (hereinafter referred to as eccentric wear) which have never been observed under the conventional common travelling conditions.

Namely, as shown in FIG. 1, the eccentric wear is locally caused in a shadowed region A near a top of a convex part 3 of a circumferential rib 2 formed in a tread of a tire T, said convex part being projected in a widthwise direction of the tire T toward a groove 1 extending zigzag along a circumferential direction of the tread, and then gradually increases to form a region A having stepwise height h and a width w in section as shown in FIG. 2. The region A of the eccentric wear gradually grows with the increase of the travelling distance and finally communicates with adjoining regions A. As a result, these regions are continuously joined with each other in the circumferential direction of tire T. Moreover, the stepwise height h and the width w are gradually enlarged with the increase of the travelling distance.

The above eccentric wear is generally called railway wear, which produces not only the recess of the groove 1 to render the appearance of the tire T awkward, but also considerably deteriorates the life of tire.

The eccentric wear begins to occur only in the vicinity of the top at the convex part 3 of the zigzag-type circumferential rib 2 and does not start from a concave part 4 of the circumferential rib 2 in opposition to the convex part 3 along the widthwise direction of the tire T. However, the concave part 4 is also subjected to railway wear in due time with the evolution of the eccentric wear.

SUMMARY OF THE INVENTION

It is an object of the invention to improve the form of zigzag grooves in the rib-type tire to fundamentally prevent the occurrence of such railway wear.

The inventors have pursued the cause of the railway wear with respect to heavy duty pneumatic radial tires having rib-type patterns of various sizes in order to solve the above problem. As a result, it has been found that the railway wear depends considerably upon an amplitude $W_1$ and a pitch P of zigzags of the groove 1.

According to the invention, there is provided a heavy duty pneumatic radial tire having a tread pattern formed in a tread divided into a plurality of circumferential ribs along a widthwise direction of tire by at least two zigzag grooves extending circumferentially of the tread, said tread being reinforced with a belt layer composed of metal cords, each of said zigzag grooves having a width, amplitude and pitch of 4.5 to 7.5%, 0.5 to 2.0% and 2.0 to 7.0%, respectively, based on a width of the tread.

BRIEF DESCRIPTION OF THE DRAWINGS

The invention will now be described in greater detail with reference to the accompanying drawings, wherein:

FIG. 3 is a graph showing a relation between the ratio of amplitude to tread width in the zigzag groove and the width of railway wear;

FIG. 4 is a graph showing a relation between the ratio of pitch to tread width in the zigzag groove and the width of railway wear;

FIG. 5 is a partial schematic view of an embodiment of the tread pattern according to the invention;

DESCRIPTION OF THE PREFERRED EMBODIMENTS

The inventors have made various studies with respect to the relation between the width w of railway wear and the ratio of amplitude $W_1$ to tread width B when the pitch P of zigzags of the groove is set to 11 mm in the rib-type radial tire having a size of 10.00 R 20, 14 PR and four grooves. As a result, it has been found that when the ratio $W_1/B$ is within a range of 0.5 to 2.0%, preferably less than 1.7%, the railway wear decreases considerably as seen from the graph of FIG. 3. When the ratio $W_1/B$ exceeds 2.0%, the railway wear is apt to be caused, while when the ratio $W_1/B$ is less than 0.5% or the edge of the zigzag groove becomes straight, the railway wear is also caused.

Figure 1:
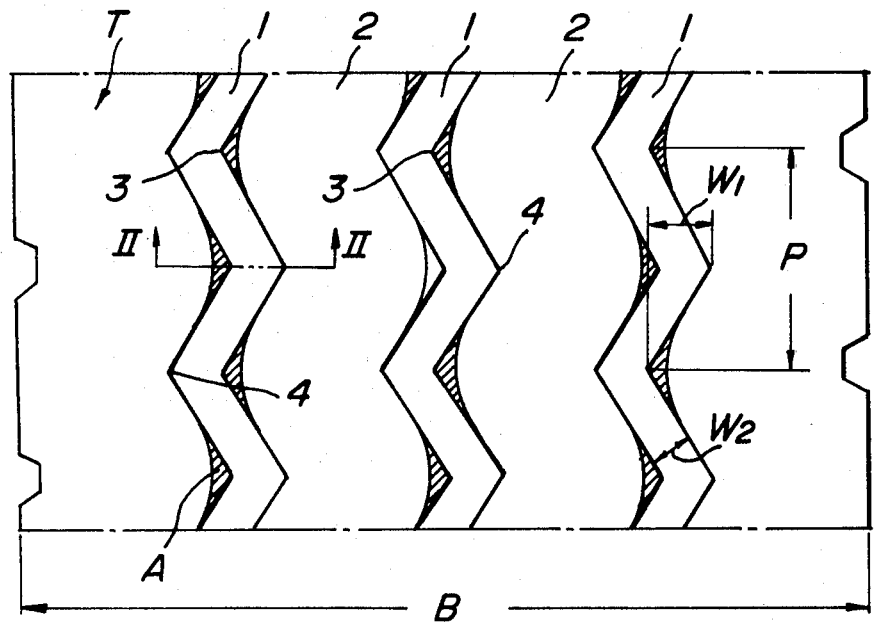
FIG. 1 is a partial schematic view illustrating the eccentric wear caused in the conventional heavy duty pneumatic radial tire.
Figure 2:
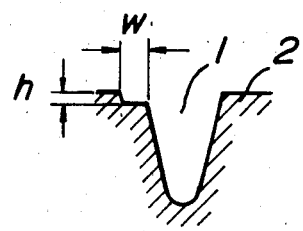
FIG. 2 is a cross-sectional view taken along the line II—II in FIG. 1.

The term "tread width B" used herein means a ground contact width of the tire as shown in FIG. 1. Further, the degree of railway wear is generally expressed by the stepwise height h formed in the convex part 3 of the circumferential rib 2 facing to the zigzag groove 1 as shown in FIG. 2. However, since the stepwise height h and the width w are correlative with each other, the larger the stepwise height h, the larger the width w. Therefore, the inventors have evaluated the railway wear by the width w in FIG. 3.

In FIG. 4 is shown the relation between the ratio of pitch P to tread width B and the width w of railway wear when the amplitude $W_1$ is constant. From the result of FIG. 4, it has been found that the ratio P/B should be within a range of 2.0 to 7.0%, preferably 2.5 to 6.0% in order to diminish the railway wear. When the ratio P/B is less than 2.0%, there are many problems in the production and effect of the zigzag groove, while when the ratio P/B exceeds 7.0%, the railway wear itself increases considerably.

In the above mentioned rib-type radial tires, the number of the zigzag groove is usually at least two, preferably four. Moreover, a width $W_2$ of the groove should be within a range of 4.5 to 7.5%, preferably 5.0 to 7.0% of the tread width B considering the draining performance and the like during the travelling on wet road. Particularly, in case of the heavy duty pneumatic radial tires for truck and the like, the width of the zigzag groove cannot unreasonably be enlarged because it is necessary to ensure a wide area for the rib in order to improve the wear life of tire.

The width $W_2$ of the zigzag groove is a distance between the two sides or extention lines thereof defining the groove 1 measured in a direction perpendicular to the side of the groove as shown in FIG. 1.

The invention will be described with reference to the following examples.

Figure 6:
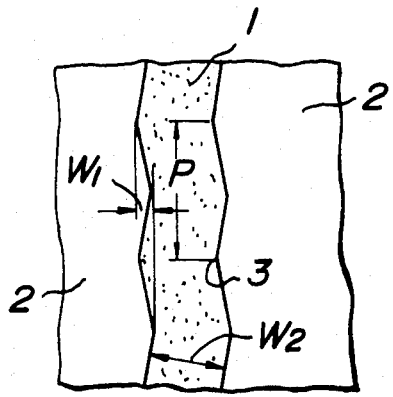
FIG. 6 is a partly detailed plan view of the zigzag groove according to the invention.

In FIG. 5 is shown an embodiment of the tread pattern according to the invention wherein zigzag grooves 1 extending in a circumferential direction of tread are arranged at substantially equal intervals in a widthwise direction of tire. In the embodiment of FIG. 6 showing the enlarged groove portion of FIG. 5, the tire has the following relations, i.e. $W_2/B=6.9\%$, $W_1/B=1.1\%$ and $P/B=5.6\%$, provided that the tread width B is set to 180 mm.

Further, this tire has the following dimension and construction;
Size: 10.00 R 20 14 PR
Carcass: One ply of metal cords (Cord angle is 90° with respect to the circumferential direction of tire.)
Belt: Three layers of metal cords (Cord angle of each layer is 15° with respect to the circumferential direction of tire.)

Then, the railway wear was actually tested with respect to the above tire and the tire of the prior art (the zigzag groove having a width $W_2$ of 9.6 mm, an amplitude $W_1$ of 5.0 mm and a pitch P of 25 mm is used in accordance with the tread pattern shown in FIG. 1, i.e. $W_2/B=5.3\%$, $W_1/B=2.8\%$, $P/B=13.9\%$) to obtain the following results.

Test conditions:
Vehicle: large-sized flat body truck
Load: maximum load
Inner pressure: 7.25 kg/cm²
Road course: high speed road 70%, general road 30%
Speed: 80 km/hr for high speed road, 40 km/hr for general road
Travelling distance: 35,000 km
Mounting position for tire: front wheel (the tires were changed in its right and left positions every 5,000 km.)
Test result:

The degree of railway wear is measured to obtain a result expressed by h and w defined in FIG. 2 as shown in the following table.

|  | h (stepwise height) | w (width) |
| --- | --- | --- |
| Tire of the prior art | 1.2 mm | 7.0 mm |
| Tire of the invention | 0.4 mm | 0.8 mm |

As seen from the above data, the tire of the invention considerably improves the railway wear when compared with the tire of the prior art and contributes to improve durability and tire performances in the rib-type heavy duty pneumatic radial tire by the provision of zigzag grooves extending circumferentially of tire in the shape apart from the conventional rib-type tread pattern.

Figure 7:
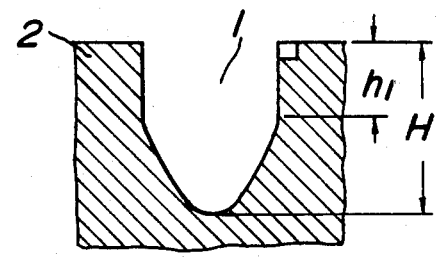
FIG. 7 is a cross-sectional view of the zigzag groove according to the invention.

In FIG. 7 is shown a cross section of a practically preferred zigzag groove 1 wherein the side wall of the groove is substantially 90° with respect to a tread outer surface over a height from the tread outer surface $h_1$ corresponding to at least not more than 30% of a depth H of the groove. Such a cross section of the zigzag groove 1 further diminishes the railway wear.

Figure 8:
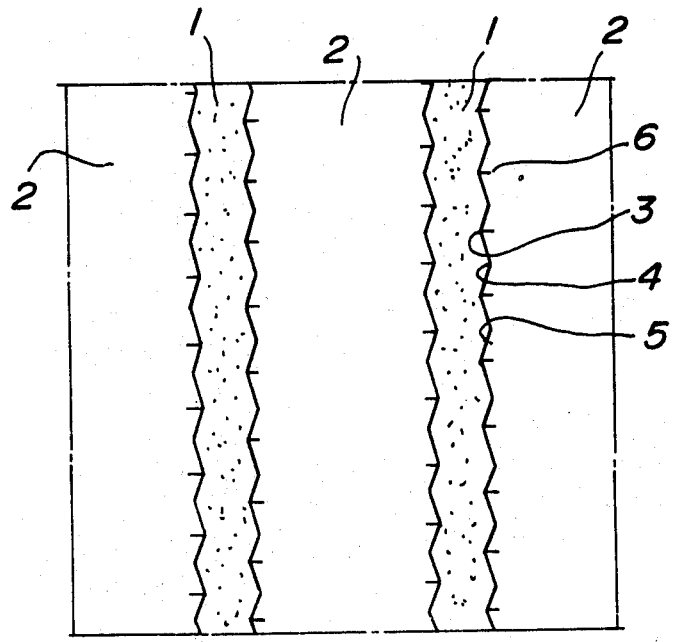
FIG. 8 is a partial schematic view of another embodiment of the tread pattern according to the invention.

As shown in FIG. 8, sipes 6 may be provided in an edge 5 of a circumferential rib 2 defined between the zigzag grooves 1 extending in a circumferential direction of the tread, particularly convex parts 3, said sipes being parallel to an axial direction of tire and opened toward the groove 1, whereby the wet performance of tire can be further improved.

In the sipe 6, the opened width is preferably 0.3 to 1.0 mm, the depth is preferably not less than 50% of the depth of the groove, and the length in the axial direction of tire is preferably within a range of 75 to 150% based on the amplitude $W_1$ of the groove 1. Moreover, the sipes 6 are usually located at intervals corresponding to the zigzag pitch P in the circumferential direction of tire or may be arranged in concave parts 4 of the circumferential rib 2 or at a middle position between the convex part 3 and the concave part 4. In any case, when the length of the sipe 6 is too long, the wet performance is improved, but an eccentric wear known as heal-and-toe wear is caused in the tread portion around the sipe 6, so that the use of the very long sipe 6 is not favorable.

As mentioned above, according to the invention, eccentric wear, particularly railway wears in the heavy duty pneumatic radial tires can considerably be diminished.

What is claimed is:

1. In a heavy duty pneumatic radial tire having a tread pattern formed in a tread divided into a plurality of circumferential ribs along a widthwise direction of tire by at least two zigzag grooves extending circumferentially of said tread, said tread being reinforced with a belt layer composed of metal cords, the improvement which comprises a width, amplitude and pitch of each said zigzag groove being 4.5 to 7.5%, 0.5 to 2.0% and 2.0 to 7.0%, respectively, based on a width of said tread; each zigzag groove having a cross section in which a side wall is substantially 90° with respect to a tread outer surface over a height from said tread outer surface corresponding to less than 30% of a depth of said zigzag groove.

2. A tire as set forth in claim 1, wherein said tread includes sipes opened toward said zigzag groove in an edge of said circumferential rib and said sipe extends in a widthwise direction of tire at a length of 70 to 150% of said amplitude of the zigzag groove.

* * * * *